Feb. 1, 1927. 1,616,430
J. METHNER
CUTTING MECHANISM FOR MOWERS WITH PARTLY COVERING HOOD
Filed Dec. 8, 1924
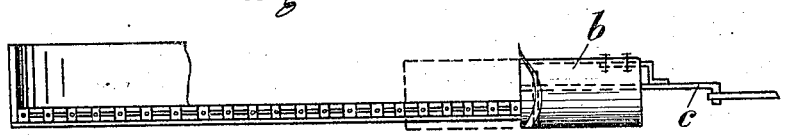
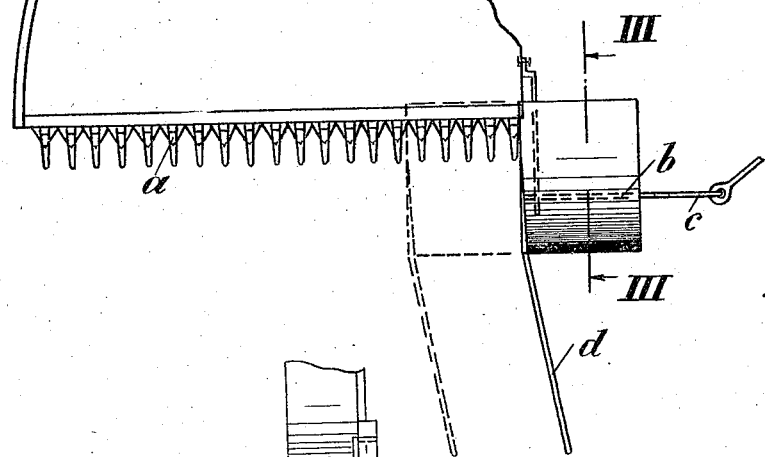
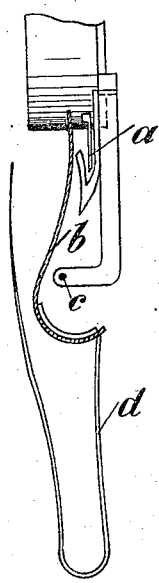

Patented Feb. 1, 1927.

1,616,430

UNITED STATES PATENT OFFICE.

JOHANN METHNER, OF GUHRAU, GERMANY.

CUTTING MECHANISM FOR MOWERS WITH PARTLY COVERING HOOD.

Application filed December 8, 1924, Serial No. 754,646, and in Germany December 7, 1923.

This invention relates to a covering hood designed to cover a certain portion of the cutting mechanism of mowing machines in order to keep the ears of overhanging corn stalks away from the cutting mechanism. The covering hood is shiftably mounted on and above the cutting mechanism and controlled from the driver's seat by means of a system of levers so that the driver, when the machine encounters corn stalks with overhanging ears, may cover the corresponding portion of the cutting mechanism by said covering hood, to prevent the ears getting between the knives. Cutting of overhanging ears from the stalks is thus effectively prevented.

An embodiment of the invention is shown, by way of example, in the accompanying drawings, in which:—

Fig. 1 is a front elevation and
Fig. 2 a plan view.
Fig. 3 is a section on line III—III of Fig. 2.

On the cutting mechanism $a$ of a mowing machine, a covering hood $b$ is shiftably mounted. The covering hood $b$ is controlled by a system of levers $c$ adapted to be operated from the driver's seat (not shown).

In Fig. 2 the position of the hood is indicated in dotted lines in which it covers a portion of the cutting mechanism $a$. The dotted lines in the hood $b$ indicate the portions of rod $c$ covered by the hood and the holder which serves as guide for the rod $c$. This holder is clearly shown in Fig. 3 and also the eye in which the rod $c$ is guided. The hood $b$ is operated from the driver's seat (not shown in the drawing). The driver pushes forward with his foot a crank which operates through the intermediary of the connecting rod the rod $c$ shown in Fig. 2 so that the hood $b$ is shifted—to the left in Fig. 2—and pushed over the cutting mechanism $a$, for intance into the poition indicated by dotted lines in this Fig. 2.

The covering hood $b$ is shiftable on the cutting mechanism in longitudinal direction so that it may cover any desired portion of this mechanism and so that it can be moved away from said cutting mechanism in lateral direction. $d$ is an element rigid to the covering hood, a so-called divider, by means of which the driver is able to accurately regulate the position of the covering hood according to the depth which the mowing machine has to penetrate into the corn field. Owing to the divider $d$ the driver of the mowing machine can observe the cutting of the corn and accordingly cover or uncover the cutting mechanism.

The divider $d$ is inclined in order to move in advance of the covering hood to prepare the work and facilitate the work for the same.

I claim:

In combination with the cutting mechanism of a mowing machine, a covering hood movably placed on one end of said cutting mechanism, a push rod parallel to said cutting mechanism fixed in said hood and supporting said hood, and a means on the mowing machine for shifting said rod and by the same said hood so that said hood covers said cutting mechanism at any desired part thereof to prevent overhanging ears of corn stalks getting between the cutting knives.

In testimony whereof I affix my signature.

JOHANN METHNER.